US012282687B2

(12) United States Patent
Porzio et al.

(10) Patent No.: US 12,282,687 B2
(45) Date of Patent: Apr. 22, 2025

(54) PRIORITIZATION OF BACKGROUND MEDIA MANAGEMENT OPERATIONS IN MEMORY SYSTEMS

(71) Applicant: Micron Technology, Inc., Boise, ID (US)

(72) Inventors: Luca Porzio, Casalnuovo di Napoli (IT); Ciro Feliciano, Casandrino (IT)

(73) Assignee: Micron Technology, Inc., Boise, ID (US)

( * ) Notice: Subject to any disclaimer, the term of this patent is extended or adjusted under 35 U.S.C. 154(b) by 41 days.

(21) Appl. No.: 18/199,057

(22) Filed: May 18, 2023

(65) Prior Publication Data

US 2023/0401007 A1 Dec. 14, 2023

Related U.S. Application Data

(60) Provisional application No. 63/350,606, filed on Jun. 9, 2022.

(51) Int. Cl.
*G06F 3/06* (2006.01)
*G06F 12/02* (2006.01)

(52) U.S. Cl.
CPC .......... *G06F 3/0659* (2013.01); *G06F 3/0604* (2013.01); *G06F 3/0679* (2013.01); *G06F 12/0246* (2013.01)

(58) Field of Classification Search
CPC .. G06F 12/0246; G06F 3/0604; G06F 3/0659; G06F 3/0679; G06F 12/0646; G06F 2212/7211
See application file for complete search history.

(56) References Cited

U.S. PATENT DOCUMENTS

| | | | |
|---|---|---|---|
| 9,281,045 B1* | 3/2016 | Anand | G11C 11/4096 |
| 2015/0019830 A1* | 1/2015 | Park | G06F 3/0626 |
| | | | 711/165 |
| 2017/0365352 A1* | 12/2017 | Shin | G11C 16/3418 |
| 2019/0294358 A1* | 9/2019 | Suzuki | G06F 3/064 |
| 2020/0333958 A1* | 10/2020 | Lee | G06F 3/0652 |

OTHER PUBLICATIONS

Jedec Standard, "Embedded Multi-Media Card (e-MMC) Electrical Standard (5.1)", JESD84-851 (Revision of JESD84-B50.1, Jul. 2014), Feb. 2015, https://www.jedec.org/sites/default/files/docs/JESD84-851.pdf, 352 pages.

* cited by examiner

*Primary Examiner* — Jane W Benner
(74) *Attorney, Agent, or Firm* — Lowenstein Sandler LLP (57) ABSTRACT

Described are systems and methods for prioritization of background media management operations in memory systems. An example system comprises a controller coupled to a memory array comprising a plurality of memory cells. The controller is configured to perform operations, comprising: identifying a plurality of address ranges referencing respective sets of memory cells of the memory array, wherein each address range is associated with a respective memory access operation counter reflecting a number of memory access operations that have been performed with respect to a corresponding set of memory cells; identifying, among the plurality of address ranges, an address range associated with a maximum value of a corresponding memory access operation counter; and causing a media management operation to be performed with respect to a set of memory cells referenced by the identified address range.

20 Claims, 7 Drawing Sheets

PRIORITIZATION OF BACKGROUND MEDIA MANAGEMENT OPERATIONS IN MEMORY SYSTEMS

REFERENCE TO RELATED APPLICATIONS

This application claims the benefit of U.S. Provisional Application No. 63/350,606, filed Jun. 9, 2022, which is incorporated by reference herein.

TECHNICAL FIELD

Embodiments of the disclosure relate generally to memory sub-systems, and more specifically, to prioritization of background media management operations in memory systems.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to prioritization of background media management operations in memory systems. A memory sub-system can include one or more storage devices, memory modules, or a combination of storage devices and memory modules. Examples of storage devices and memory modules are described below in conjunction with FIG. 1. In general, a host system can utilize a memory sub-system that includes one or more memory components, such as memory devices that store data. The host system can provide data to be stored at the memory sub-system and can request data to be retrieved from the memory sub-system.

A memory sub-system can utilize one or more memory devices, including any combination of the different types of non-volatile memory devices and/or volatile memory devices, to store the data provided by the host system. In some embodiments, non-volatile memory devices can be provided by negative-and (NAND) type flash memory devices. Other examples of non-volatile memory devices are described below in conjunction with FIG. 1. A non-volatile memory device is a package of one or more dice. Each die can include one or more planes. A plane is a portion of a memory device that includes multiple memory cells. Some memory devices can include two or more planes. For some types of non-volatile memory devices (e.g., NAND devices), each plane includes a set of physical blocks. Each block includes a set of pages. "Block" herein shall refer to a set of contiguous or non-contiguous memory pages. A "block" can refer to a unit of the memory device used to store data and can include a group of memory cells. An example of a "block" is an "erasable block," which is the minimal erasable unit of memory, while "page" is a minimal writable unit of memory. Each page includes a set of memory cells. A memory cell is an electronic circuit that stores information.

A memory device can include multiple memory cells arranged in a two-dimensional grid. The memory cells are formed onto a silicon wafer in an array of columns and rows. A memory cell includes a capacitor that holds an electric charge and a transistor that acts as a switch controlling access to the capacitor. Accordingly, the memory cell can be programmed (written to) by applying a certain voltage, which results in an electric charge being held by the capacitor. The memory cells are joined by wordlines, which are conducting lines electrically connected to the control gates of the memory cells, and bitlines, which are conducting lines electrically connected to the drain electrodes of the memory cells.

Depending on the cell type, each memory cell can store one or more bits of binary information and has various logic states that correlate to the number of bits being stored. The logic states can be represented by binary values, such as "0" and "1", or combinations of such values. A memory cell can be programmed (written to) by applying a certain voltage to the memory cell, which results in an electric charge being held by the memory cell, thus allowing modulation of the voltage distributions produced by the memory cell. A set of memory cells referred to as a memory page can be programmed together in a single operation, e.g., by selecting consecutive bitlines.

Precisely controlling the amount of the electric charge stored by the memory cell allows establishing multiple logical levels, thus effectively allowing a single memory cell to store multiple bits of information. A read operation can be performed by comparing the measured threshold voltages (Vt) exhibited by the memory cell to one or more reference voltage levels in order to distinguish between two logical levels for single-level cell (SLCs) and between multiple logical levels for multi-level cells. In various embodiments, a memory device can include multiple portions, including, e.g., one or more portions where the sub-blocks are configured as SLC memory and one or more portions where the sub-blocks are configured as multi-level cell (MLC)

memory that can store three bits of information per cell and/or (triple-level cell) TLC memory that can store three bits of information per cell. The voltage levels of the memory cells in TLC memory form a set of 8 programming distributions representing the 8 different combinations of the three bits stored in each memory cell. Depending on how they are configured, each physical page in one of the sub-blocks can include multiple page types. For example, a physical page formed from single level cells (SLCs) has a single page type referred to as a lower logical page (LP). Multi-level cell (MLC) physical page types can include LPs and upper logical pages (UPs), TLC physical page types are LPs, UPs, and extra logical pages (XPs), and quad level cells (QLC) physical page types are LPs, UPs, XPs and top logical pages (TPs). For example, a physical page formed from memory cells of the QLC memory type can have a total of four logical pages, where each logical page can store data distinct from the data stored in the other logical pages associated with that physical page.

Memory access operations (e.g., a programming (write) operation, an erase operation, etc.) can be executed with respect to sets of the memory cells, e.g., in response to receiving memory access commands from the host. A memory access operation can specify the requested memory access operation (e.g., write, erase, read, etc.) and a logical address, which the memory sub-system would translate to a physical address identifying a set of memory cells (e.g., a block).

A memory device can be installed, e.g., on a motor vehicle, in a mobile communication device, or in other devices and systems. During the final production stages, such a memory device can be programmed, e.g., with a system image, which would cause the computing device to boot upon the first power up. After the programming operation and before the first power up, the memory device would be installed (e.g., soldered) within a system or device, shipped, stored, and/or otherwise exposed to various other operations, at least some of which can subject the memory device to a thermal stress. The thermal stress can affect the charge levels of the memory cells, thus increasing the read error rates and/or rendering the memory device less resistant to various other forms of field stress.

In order to mitigate the effects of the field stress, the memory device can be subjected to media management operations, such as data refresh operations. A data refresh operation reads the data stored by a set of memory cells (e.g., a physical block of a memory device), correct eventual errors, and copy the data into another set of memory cells (e.g., into another physical block of the memory device).

In some implementations, the media management operations can be performed at the final production stages. However, such operations can span over considerable time periods, thus reducing the production throughput and/or increasing the production costs. In order to mitigate these and other adverse effects, the media management operations can be performed in the field, e.g., during the final stages of the first power-up sequence of the memory device.

In order to not interfere with the normal functioning of the system hosting the memory device, the media management operations can be performed in the background mode thus allowing other memory access operations to be performed normally. In an illustrative example, a solid state drive (SSD) can be mounted in an infotainment system of a motor vehicle, and then the infotainment system can be powered up in order to perform post-production testing. In another illustrative example, a universal flash storage (UFS) device can be installed in a smartphone, which would then be powered up by the end user.

Thus, while the media management operations are performed in the background, other memory access operations (e.g., read and/or write operations) can be performed in course of the normal functioning of the system hosting the memory device. These memory access operations can cause read disturb effects, which would be combined with the thermal stress, thus further reducing the already limited read margin. Notably, these adverse effects would occur with respect to the data that is most needed at that time (e.g., the system image that is utilized by the boot sequence of the host).

Implementations of the present disclosure alleviate the above-referenced and other deficiencies by performing the media management operations in a certain order rather than randomly. In some implementations, the media manager can utilize the Production State Awareness (PSA) information in order to determine whether the memory sub-system is operating in the field or in the production environment and choose the appropriate method of performing media management operations. For example, responsive to determining that the memory device operates in the field, the media manager can implement a media management operation ordering technique that is based on the intensity of memory access operations (e.g., read operations) with respect to pre-defined physical or logical address ranges.

In an illustrative example, the memory device controller can split the address space (e.g., the logical address space or the physical address space) of the memory device into a sequence of address ranges of a pre-defined size. The controller can maintain metadata storing, for every address range, a corresponding memory access operation counter (e.g., read operation counter).

These memory access operation counters can be utilized for ordering the media management operations (e.g., refresh operations), which can be performed in the background mode with respect to sets of memory cells referenced by the address ranges, in the reverse order of the corresponding memory access operation counters. Thus, the controller can identify, among the memory access operation counters, the counter having the maximum value and initiate a media management operation with respect to the set of memory cells referenced by the corresponding address range. Upon completing the media management operation, the controller can identify the next highest value of the memory access operation counter and initiate a media management operation with respect to the set of memory cells referenced by the corresponding address range, and so on, until all media management operations are performed with respect to all address ranges. Should a new memory access operation be requested during a background media management operation, the current media management operation is suspended thus allowing the requested memory access operation to proceed. Upon completing the memory access operation, the memory access operation counters are updated to reflect the completed operation, as described in more detail herein below.

The above-described technique allows performing the background media management operations in the order of intensity of the host access operations with respect sets of memory cells falling within predefined address ranges, thus reducing the adverse effect of read disturb on weak memory cells and mitigating the risk of losing critical system data.

Various aspects of the methods and systems are described herein by way of examples, rather than by way of limitation.

The systems and methods described herein can be implemented by hardware (e.g., general purpose and/or specialized processing devices, and/or other devices and associated circuitry), software (e.g., instructions executable by a processing device), or a combination thereof.

Figure 1:
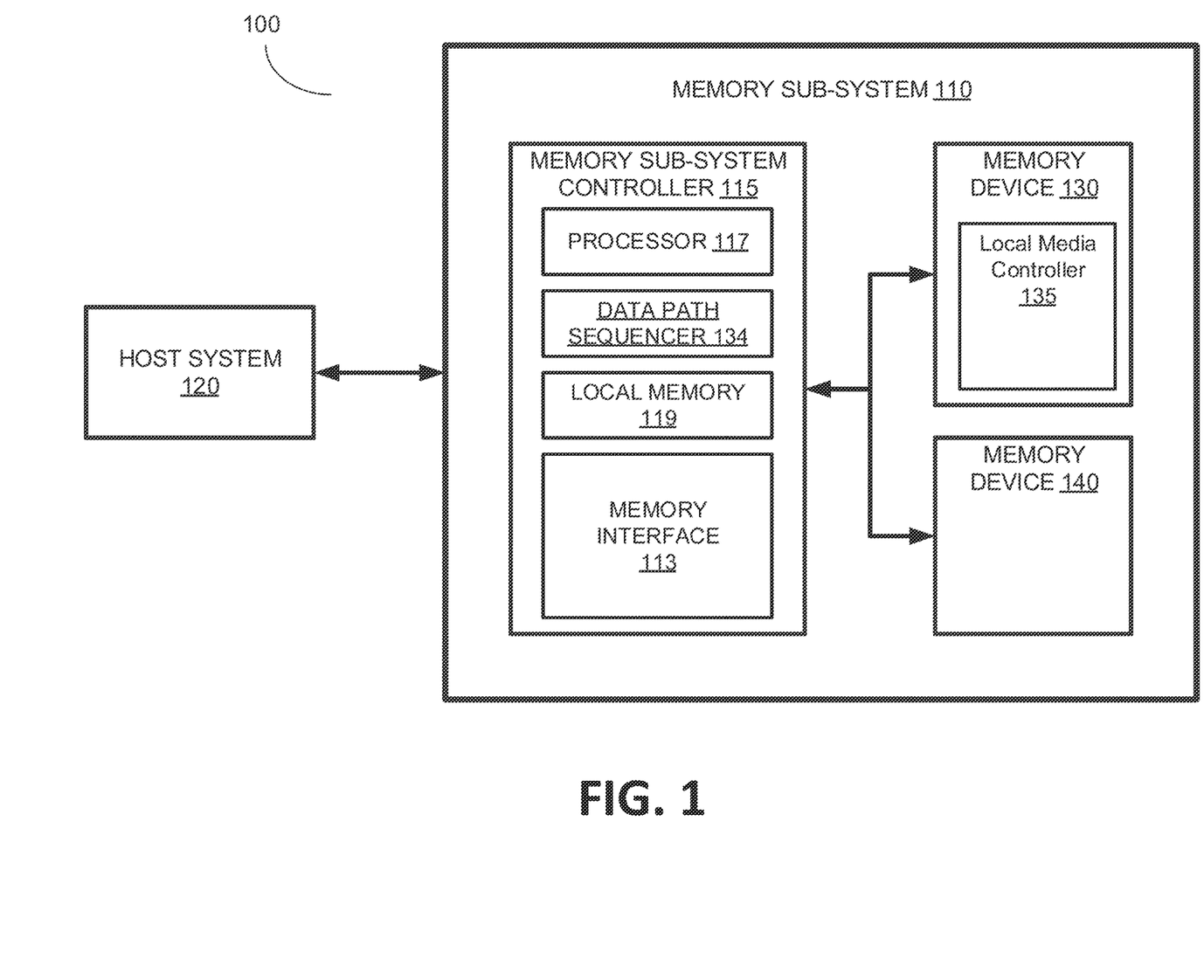
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 ("controller") can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which includes a raw memory device 130 having control logic (e.g., local media controller 135) on the die and a controller (e.g., memory sub-system controller 115) for media management within the same memory device package. An example of a managed memory device is a managed NAND (MNAND) device.

In one embodiment, the memory sub-system 110 includes a memory interface component 113. Memory interface component 113 is responsible for handling interactions of memory sub-system controller 115 with the memory devices of memory sub-system 110, such as memory device 130. For example, memory interface component 113 can send memory access commands corresponding to requests received from host system 120 to memory device 130, such as program commands, read commands, or other commands. In addition, memory interface component 113 can receive data from memory device 130, such as data retrieved in response to a read command or a confirmation that a program command was successfully performed. For example, the memory sub-system controller 115 can include a processor 117 (processing device) configured to execute instructions stored in local memory 119 for performing the operations described herein.

In one embodiment, the memory sub-system controller 115 includes a media manager 134 employed to perform media management operations. In some embodiments, at least part of the functionality of the media manager 134 can be performed by the local media controller 135. In some embodiments, media manager 134 is implemented by firmware, hardware components, or a combination of the above. In some embodiments, instructions implementing methods 500 and/or 600 described herein below can be stored as instructions (e.g., firmware) on memory device 130 and the program manager 134 can be implemented as control logic (e.g., local media controller 135) executing these instructions.

In some implementations, the media manager 134 can utilize the PSA information, which can be provided by a dedicated field in an internal register storing device-specific data, in order to determine whether the memory sub-system is operating in the field or in the production environment and choose the appropriate method of performing media management operations.

In some implementations, responsive to determining that the memory device operates in the field, the media manager 134 can implement a media management operation ordering technique that is based on the intensity of memory access operations (e.g., read operations) with respect to pre-defined physical or logical address ranges. In particular, the media manager 134 can maintain metadata storing, for every pre-defined address range within the physical or logical address space of the memory device, a corresponding memory access operation counter (e.g., read operation counter). These memory access operation counters can be utilized for ordering the media management operations (e.g., refresh operations), which can be performed in the background mode with respect to sets of memory cells referenced by the address ranges, in the reverse order of the corresponding memory access operation counters, as described in more detail herein below with reference to FIGS. 4-6.

Figure 2:
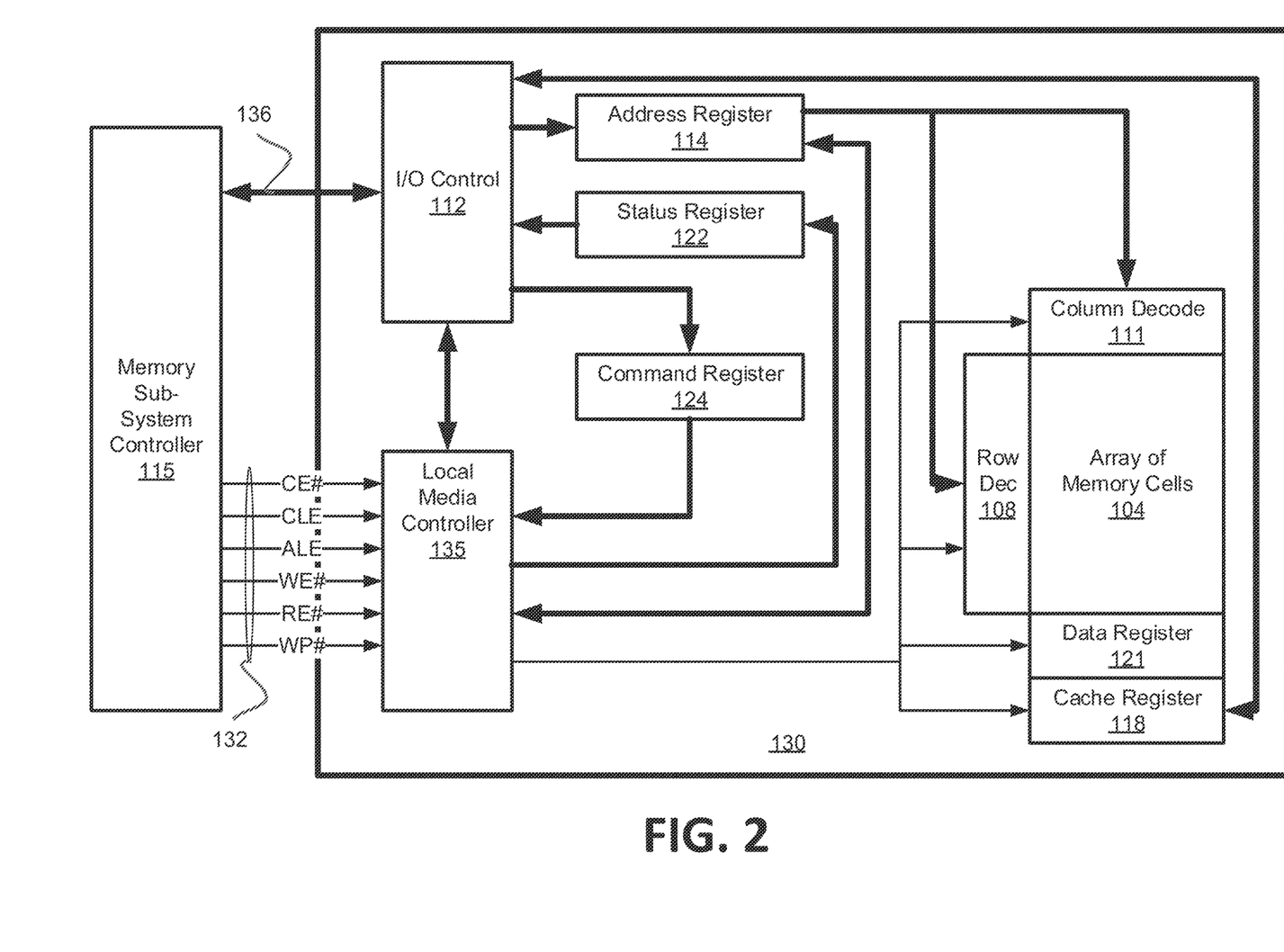
FIG. 2 is a block diagram of a memory device in communication with a memory sub-system controller of a memory sub-system, according to an embodiment.

FIG. 2 is a simplified block diagram of a first apparatus, in the form of a memory device 130, in communication with a second apparatus, in the form of a memory sub-system controller 115 of a memory sub-system (e.g., memory sub-system 110 of FIG. 1), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), can be a memory controller or other external host device.

Memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bitline). A single access line can be associated with more than one logical row of memory cells and a single data line can be associated with more than one logical column. Memory cells (not shown in FIG. 2) of at least a portion of array of memory cells 104 are capable of being programmed to one of at least two target data states.

Row decode circuitry 108 and column decode circuitry 111 are provided to decode address signals. Address signals are received and decoded to access the array of memory cells 204. Memory device 130 also includes input/output (I/O) control circuitry 112 to manage input of commands, addresses and data to the memory device 130 as well as output of data and status information from the memory device 130. An address register 114 is in communication with I/O control circuitry 112 and row decode circuitry 108 and column decode circuitry 111 to latch the address signals prior to decoding. A command register 124 is in communication with I/O control circuitry 112 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 204. The local media controller 135 is in communication with row decode circuitry 108 and column decode circuitry 111 to control the row decode circuitry 108 and column decode circuitry 111 in response to the addresses.

The local media controller 135 is also in communication with a cache register 218. Cache register 118 latches data, either incoming or outgoing, as directed by the local media controller 135 to temporarily store data while the array of memory cells 104 is busy writing or reading, respectively, other data. During a programming operation (e.g., a write operation), data can be passed from the cache register 118 to the data register 121 for transfer to the array of memory cells 204; then new data can be latched in the cache register 118 from the I/O control circuitry 212. During a read operation, data can be passed from the cache register 118 to the I/O control circuitry 112 for output to the memory sub-system controller 115; then new data can be passed from the data register 121 to the cache register 218. The cache register 118 and/or the data register 121 can form (e.g., can form a portion of) a page buffer of the memory device 130. A page buffer can further include sensing devices (not shown in FIG. 2) to sense a data state of a memory cell of the array of memory cells 204, e.g., by sensing a state of a data line connected to that memory cell. A status register 122 can be in communication with I/O control circuitry 112 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) can be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 136 and outputs data to the memory sub-system controller 115 over I/O bus 136.

For example, the commands can be received over input/output (I/O) pins [7:0] of I/O bus 136 at I/O control circuitry 112 and can then be written into command register 224. The addresses can be received over input/output (I/O) pins [7:0] of I/O bus 136 at I/O control circuitry 112 and can then be written into address register 214. The data can be received over input/output (I/O) pins [7:0] for an 8-bit device or input/output (I/O) pins [15:0] for a 16-bit device at I/O control circuitry 112 and then can be written into cache register 218. The data can be subsequently written into data register 121 for programming the array of memory cells 204.

In an embodiment, cache register 118 can be omitted, and the data can be written directly into data register 220. Data can also be output over input/output (I/O) pins [7:0] for an 8-bit device or input/output (I/O) pins [15:0] for a 16-bit device. Although reference can be made to I/O pins, they can include any conductive node providing for electrical connection to the memory device 130 by an external device (e.g., the memory sub-system controller 115), such as conductive pads or conductive bumps as are commonly used.

In some implementations, additional circuitry and signals can be provided, and that the memory device 130 of FIG. 2 has been simplified. It should be recognized that the functionality of the various block components described with reference to FIG. 2 can not necessarily be segregated to distinct components or component portions of an integrated circuit device. For example, a single component or component portion of an integrated circuit device could be adapted to perform the functionality of more than one block component of FIG. 2. Alternatively, one or more components or component portions of an integrated circuit device could be combined to perform the functionality of a single block component of FIG. 2. Additionally, while specific I/O pins are described in accordance with popular conventions for receipt and output of the various signals, it is noted that other combinations or numbers of I/O pins (or other I/O node structures) can be used in the various embodiments.

One or more memory devices of the memory sub-system 100 can be represented, e.g., by NAND memory devices that utilize transistor arrays built on semiconductor chips. As illustrated schematically in FIG. 3A, a memory cell of a memory device can be a transistor, such as metal-oxide-semiconductor field effect transistor (MOSFET), having a source (S) electrode and a drain (D) electrode to pass electric current there through. The source and drain electrodes can be connected to a conductive bitline (BL), which can be shared by multiple memory cells. A memory device can include an array or memory cells that are connected to a plurality of wordlines (WL) and a plurality of bitlines (BL). A memory device can further include circuitry for selectively coupling WLs and BLs to voltage sources providing control gate and source-drain signals.

Referring again to FIG. 3A, memory cells 302 and 304 can be connected to the same bitline N and two different conductive wordlines, M and M+1, respectively. A memory cell can further have a control gate (CG) electrode to receive a voltage signal $V_{CG}$ to control the magnitude of electric current flowing between the source electrode and the drain electrode. More specifically, there can be a threshold control gate voltage $V_T$ (herein also referred to as "threshold voltage" or simply as "threshold") such that for $V_{CG}<V_T$, the source-drain electric current can be low, but can increase substantially once the control gate voltage has exceeded the threshold voltage, $V_{CG}>V_T$. Transistors of the same memory device can be characterized by a distribution of their threshold voltages, $P(V_T)=dW/dV_T$, so that $dW=P(V_T)dV_T$ represents the probability that any given transistor has its threshold voltage within the interval $[V_T, V_T+dV_T]$. For example, FIG. 3B illustrates schematically dependence of the source-drain current $I_{SD}$ on the control gate voltage for two memory cells, e.g. memory cell 302 (solid line) and memory cell 304 (dashed line), having different threshold control gate voltages.

Figure 3A:
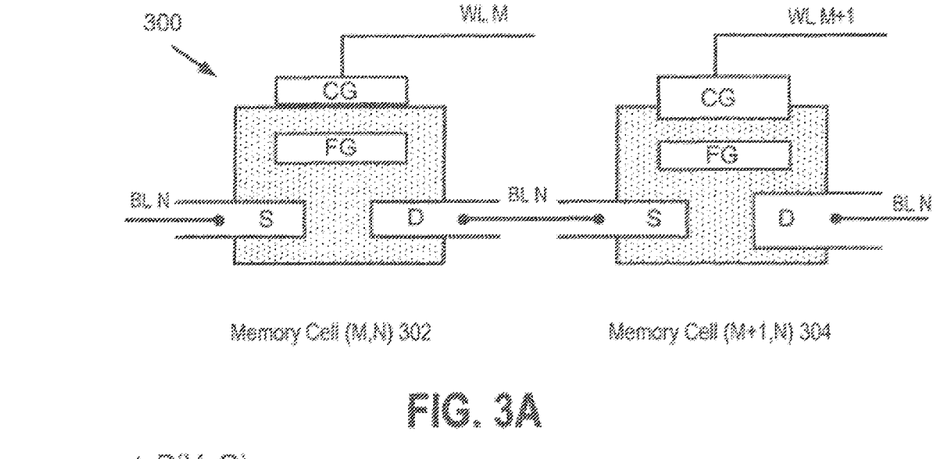
FIG. 3A schematically illustrates a set of memory cells as arranged in a memory device.
Figure 3B:
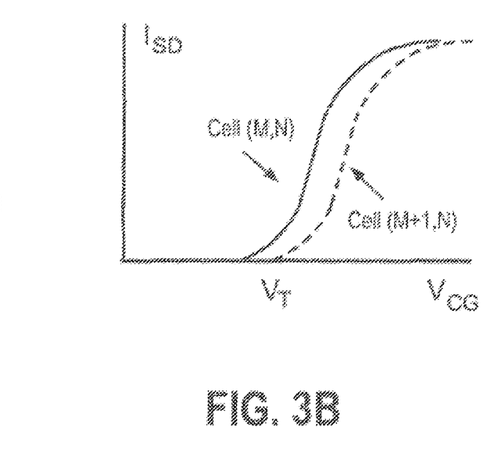
FIG. 3B schematically illustrates schematically dependence of the source-drain current on the control gate voltage for two memory cells.

To make a memory cell non-volatile, the cell can be further equipped with a conducting island—a charge storage node—that can be electrically isolated from the control gate, the source electrode, and the drain electrode by insulating layers (depicted in FIG. 3A as the dotted region). In response to an appropriately chosen positive (in relation to the source potential) control gate voltage $V_{CG}$, the charge storage node can receive an electric charge Q, which can be permanently stored thereon even after the power to the memory cell—and, consequently, the source-drain current—is ceased. The charge Q can affect the distribution of threshold voltages $P(V_T,Q)$. Generally, the presence of the electric charge Q shifts the distribution of threshold voltages towards higher voltages, compared with the distribution $P(V_T)$ for an uncharged charge storage node. This happens because a stronger positive control gate voltage $V_{CG}$ can be needed to overcome a negative potential of the charge storage node charge Q. If any charge of a sequence $Q_k$ of charges with $1 \leq k \leq 2^N$ can be selectively programmed (and later detected during a read operation) into a memory cell, the memory cell can function as an N-bit storage unit. The charges $Q_k$ are preferably selected to be sufficiently different from each other, so that any two adjacent voltage distributions $P(V_T, Q_k)$ and $P(V_T, Q_{k+1})$ do not overlap being separated by a valley margin, so that $2^N$ distributions $P(V_T, Q_k)$ are interspaced with $2^N-1$ valley margins.

Memory devices can be classified by the number of bits stored by each cell of the memory. For example, a single-level cell (SLC) memory has cells that can each store one bit of data (N=1). A multi-level cell (MLC) memory has cells that can each store up to two bits of data (N=2), a tri-level cell (TLC) memory has cells that can each store up to three bits of data (N=3), and a quad-level cell (QLC) memory has cells that can each store up to four bits of data (N=4). For example, a TLC can be capable of being in one of eight charging states $Q_k$ (where the first state is an uncharged state $Q_1=0$) whose threshold voltage distributions are separated by valley margins $VM_k$ that can be used to read out the data stored in the memory cells.

Figure 3C:
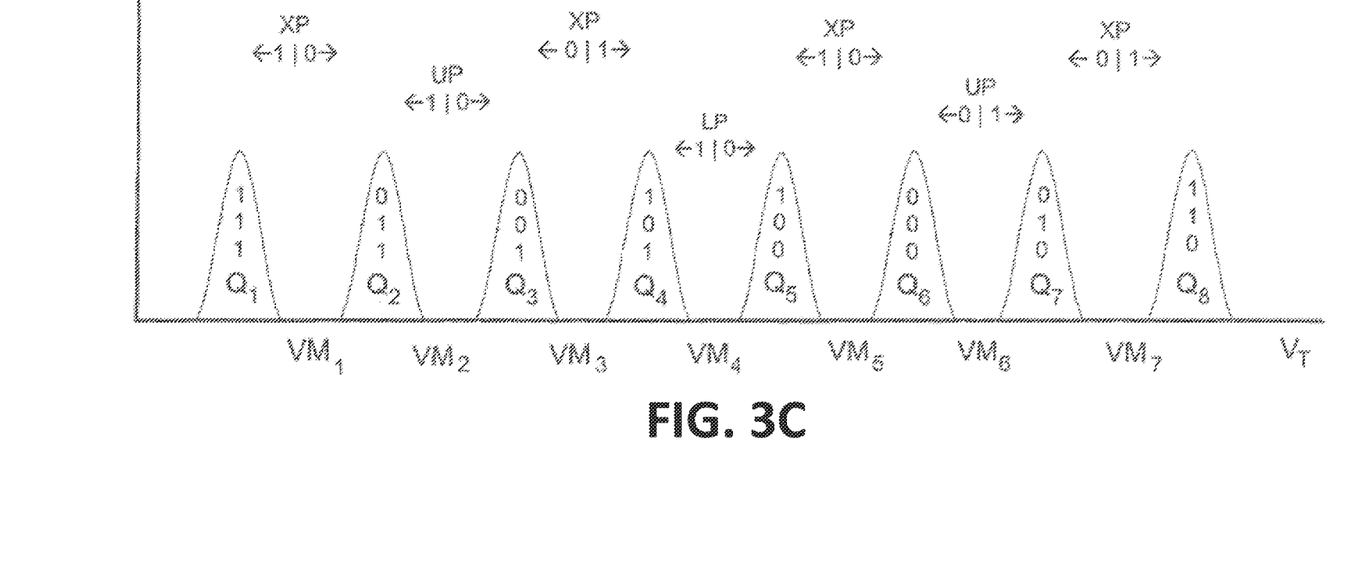
FIG. 3C schematically illustrates an example distribution of threshold control gate voltages for a memory cell.

FIG. 3C illustrates schematically a distribution of threshold control gate voltages for a memory cell capable of storing three bits of data by programming the memory cell into at least eight charge states (also referred to as "programming levels") that differ by the amount of charge on the cell's charge storage node. FIG. 3C shows distributions of threshold voltages $P(V_T, Q_k)$ for $2^N=8$ different charge states of a tri-level cell (TLC) separated with $2^3-1=7$ valley margins $VM_k$. Accordingly, a memory cell programmed into a charge state k-th (i.e., having the charge $Q_k$ deposited on its charge storage node) can be storing a particular combination of N bits (e.g., 0110, for N=4). This charge state $Q_k$ can be determined during a readout operation by detecting that a control gate voltage $V_{CG}$ within the valley margin $VM_k$ is sufficient to open the cell to the source-drain current whereas a control gate voltage within the preceding valley margin $VM_{k-1}$ is not.

Figure 4:
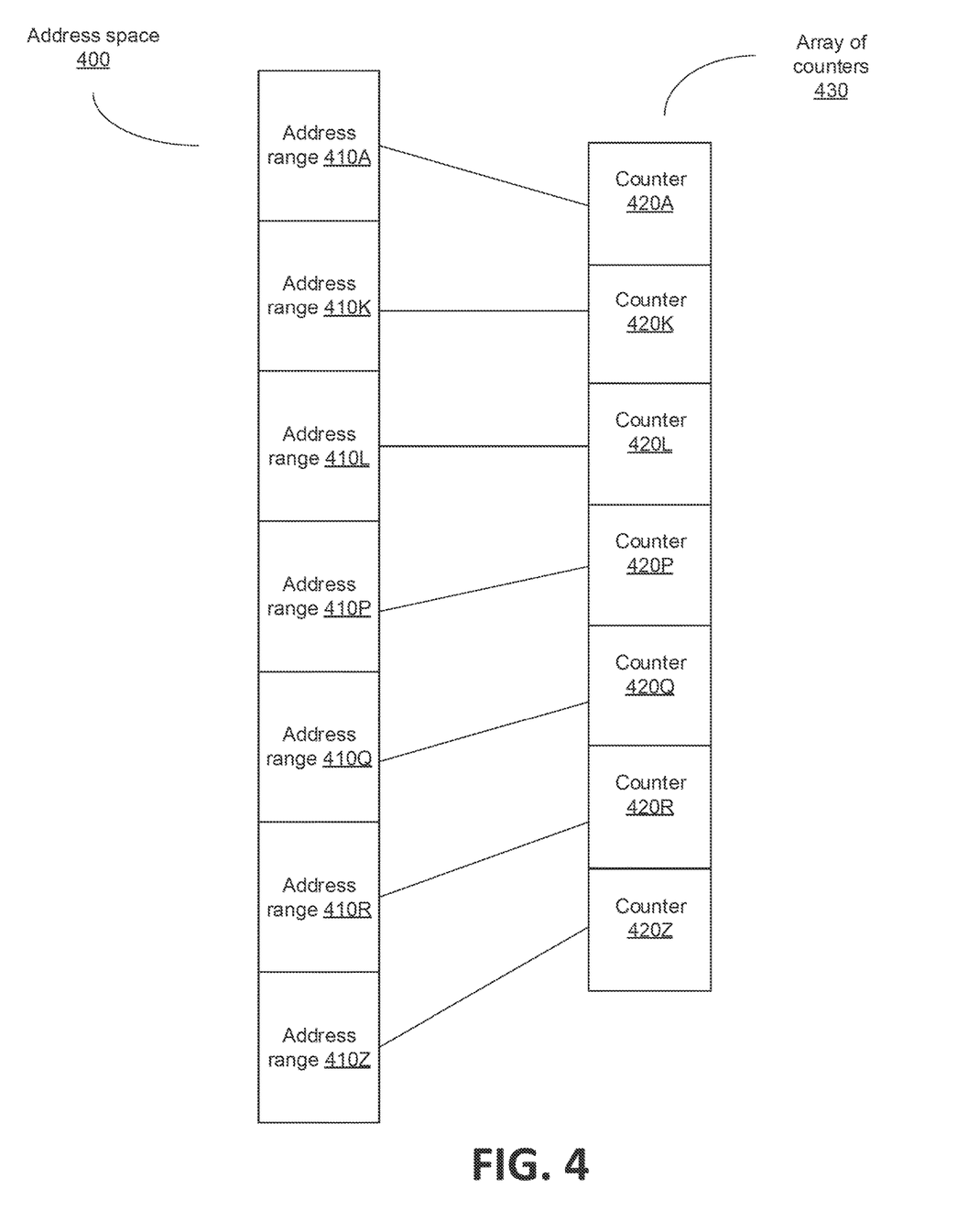
FIG. 4 schematically illustrates memory access counter metadata maintained by a controller operating in accordance with aspects of the present disclosure.

FIG. 4 schematically illustrates memory access counter metadata maintained by a controller (e.g., a memory subsystem controller 115 of FIG. 1) operating in accordance with aspects of the present disclosure. As schematically illustrated by FIG. 4, the media manager 134 can split the address space 400 (e.g., the logical address space or the physical address space) of the memory device into a sequence of address ranges 410A-410Z. In some implementations, all address ranges can be of the same pre-defined size (e.g., a predefined number of logical translation units (LTU) or physical blocks), which can be chosen based on the total capacity of the memory device in order to ensure that the media management process would be completed within a predefined time. Alternatively, address ranges of different sizes may be chosen (e.g., based on the known usage patterns of the data that is preloaded on the memory device). Furthermore, in some implementations, the address ranges may be defined on-the-fly based on the detected memory access patterns.

As noted herein above, the media manager 134 can maintain, in the metadata area of the memory device, memory access operation counters (e.g., read counters) 420A-420Z for the respective address ranges 410A-410Z. The counters 420 can be stored in a linear array 430, which can be indexed by the ordinal number (e.g., position) of the address range within the address space, such that the first counter would correspond to the first address range, the second counter would correspond to the second address range, the i-th counter would correspond to the i-th address range, and the last counter would correspond to the last address range. Upon preloading the data onto the memory device, the counters 420 can be reset to zero values.

Then, when the field operation mode is detected by the media manager 134, the memory access operations (e.g., read operations) that are performed with respect to the memory device can be tracked for a predefined period of time or a predefined amount of data having been read from the memory device, in order to initialize the memory access operation counters 420. In particular, a counter 420K corresponding to a certain address range 410K can be incremented upon performing a memory access operation (e.g., a read operation) with respect to a set of memory cells identified by one or more addresses falling within the address range 410K.

Upon completing the counter initialization, the background media management operations (e.g., refresh operations) can be performed with respect to sets of memory cells referenced by the address ranges, in the reverse order of the corresponding memory access operation counter values. In an illustrative example, the media manager 134 can, upon identifying the counter 420K having the maximum value $V_1$ among the memory access operation counters 420, initiate a media management operation with respect to the set of memory cells referenced by the corresponding address range 410K. Upon completing the media management operation, the media manager 134 can identify, among the memory access operation counters 420, the counter 420L having the next highest value $V_2$ and initiate a media management operation with respect to the set of memory cells referenced by the corresponding address range 410K. Should the highest counter value $V_3$ be associated with two or more media management operation counters 420P, 420Q, and 420R, the respective address ranges 410P, 410Q, 410R can be processed in any order (e.g., the address range for performing the next media management operation can be selected randomly among two or more address ranges 420P, 420Q, and 420R having equal media management operation counter values of Vs). This process may continue until all media management operations are performed with respect to all address ranges.

As noted herein above, a media management operation may be represented by a refresh operation, which may involve reading the data stored by a specified set of memory cells (e.g., a physical block of a memory device) referenced by an address falling within the chosen address range, correcting eventual errors, and copying the data into another set of memory cells (e.g., into another physical block of the memory device).

The media management operation may be performed in the background mode, i.e., they may have a priority level that is below any priority level associated with host-initiated media access operations. Accordingly, should a memory access operation be requested during a background media management operation, the current media management operation can be suspended thus allowing the requested memory access operation to proceed. Upon completing the intervening memory access operation, the memory access operation counters 420 can be updated to reflect the completed operation.

Figure 5:
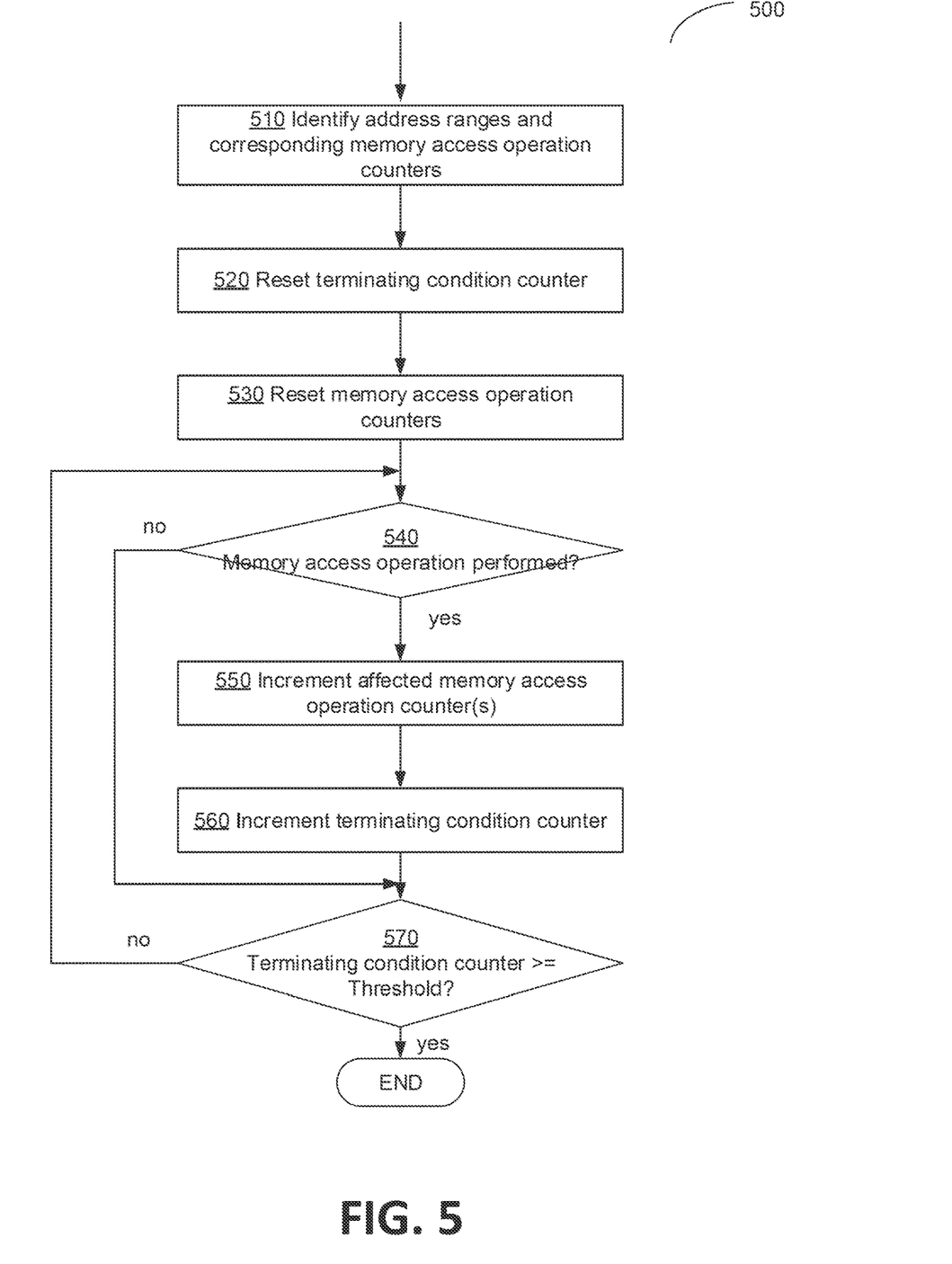
FIG. 5 is a flow diagram of an example method of initializing media management operation counters, which can be implemented by a memory controller operating in accordance with aspects of the present disclosure.

FIG. 5 is a flow diagram of an example method 500 of initializing media management operation counters, which can be implemented by a memory controller operating in accordance with aspects of the present disclosure. The method 500 can be performed by processing logic that can include hardware (e.g., general purpose or specialized processing devices, circuitry, dedicated logic, programmable logic, microcode, integrated circuits, etc.), software (e.g., instructions run or executed on a processing device), or various combinations thereof. In some implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other. In some embodiments, the method 500 is performed by the memory subsystem controller 115 and/or the local media controller 135 of FIG. 1. Operations of the method 500 can be specified by a sequence of command codes, which the processing logic can retrieve from a dedicated storage location. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment.

At operation 510, the processing logic (e.g., a controller) implementing the method identifies a plurality of address ranges referencing respective sets of memory cells of a memory array (e.g., one or more dies of a memory device), such that each address range is associated with a respective memory access operation counter reflecting a number of memory access operations (e.g., read operations) that have been performed with respect to a corresponding set of memory cells. In some implementations, an address range can be represented, e.g., by a physical address range defined by the starting physical address and the final physical address and reflecting the physical layout of the memory device. Alternatively, an address range can be represented, e.g., a logical address range defined by the starting logical address and the final logical address. Each set of memory cells can be represented, e.g., by a block of a memory array or a logical translation unit. The memory access operation counters can be stored in a metadata structure maintained in a metadata area of the memory device. The metadata structure can be represented by a linear array, which can be indexed by the ordinal number (e.g., position) of the address range within the address space, as described in more detail herein above.

At operation 520, the processing logic (e.g., a controller) implementing the method resets (e.g., to zero value) a terminating condition counter (e.g., a timer or a memory access traffic counter reflecting the amount of data having been read by the host from the memory device).

At operation 530, the processing logic resets (e.g., to zero values) a plurality of media management operation counters (e.g., read operation counters), such that each memory access operation counter reflects the number of memory access operations that have been performed with respect to a set of memory cells of a memory array (e.g., one or more dies of a memory device) whose address falls within the corresponding address range. In some implementations, an address range can be represented, e.g., by a physical address range defined by the starting physical address and the final physical address. Alternatively, an address range can be represented, e.g., a logical address range defined by the starting logical address and the final logical address. Each set of memory cells can be represented, e.g., by a block of a memory array or a logical translation unit. The memory access operation counters can be stored in a metadata structure maintained in a metadata area of the memory device. The metadata structure can be represented by a linear array, which can be indexed by the ordinal number (e.g., position) of the address range within the address space, as described in more detail herein above.

Responsive to determining, at operation 540, that a memory access operation (e.g., a read operation) has been performed, the processing logic, at operation 550, updates the memory access counter(s) associated with one or more address ranges specifying one or more sets of memory cells with respect to which the memory access operation has been performed.

At operation 560, the processing logic increments the terminating condition counter (this operation is omitted if the terminating condition counter is represented by a timer, which would be incremented asynchronously with respect to operations of method 500).

Responsive to determining, at operation 570, that the terminating condition counter has reached a predefined threshold value, the method terminates; otherwise, the method loops back to operation 540.

Figure 6:
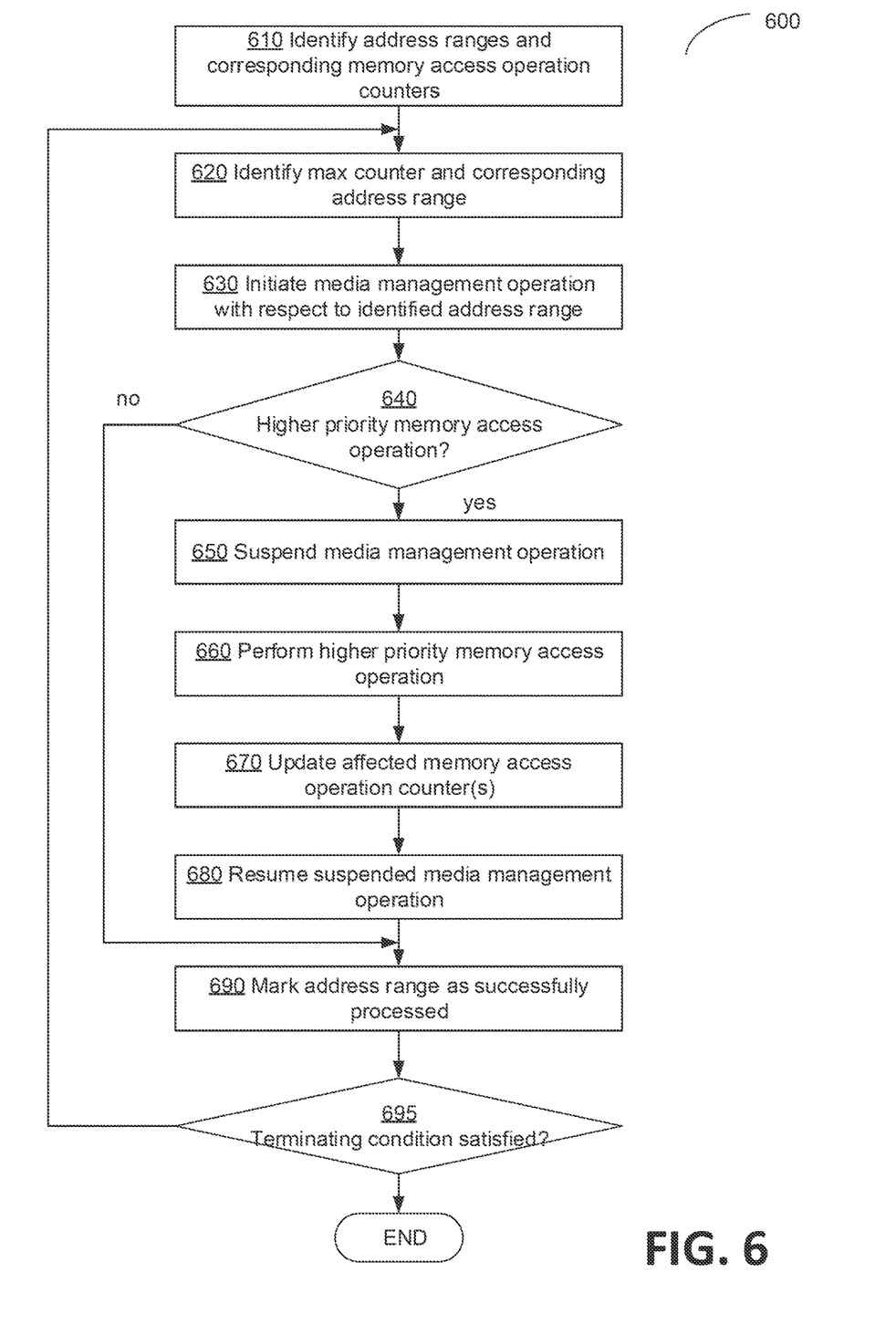
FIG. 6 is a flow diagram of an example method of performing background media management operations, which can be implemented by a memory controller operating in accordance with aspects of the present disclosure.

FIG. 6 is a flow diagram of an example method 600 of performing background media management operations, which can be implemented by a memory controller operating in accordance with aspects of the present disclosure. The method 600 can be performed by processing logic that can include hardware (e.g., general purpose or specialized processing devices, circuitry, dedicated logic, programmable logic, microcode, integrated circuits, etc.), software (e.g., instructions run or executed on a processing device), or various combinations thereof. In some implementations, method 600 may be performed by a single processing thread. Alternatively, method 600 may be performed by two or more processing threads, each thread executing one or more individual functions, routines, subroutines, or operations of the method. In an illustrative example, the processing threads implementing method 600 may be synchronized (e.g., using semaphores, critical sections, and/or other thread synchronization mechanisms). Alternatively, the processing threads implementing method 600 may be executed asynchronously with respect to each other. In some embodiments, the method 600 is performed by the memory subsystem controller 115 and/or the local media controller 135 of FIG. 1. Operations of the method 600 can be specified by a sequence of command codes, which the processing logic can retrieve from a dedicated storage location. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment.

At operation 610, the processing logic (e.g., a controller) implementing the method identifies a plurality of address ranges referencing respective sets of memory cells of a memory array (e.g., one or more dies of a memory device), such that each address range is associated with a respective memory access operation counter reflecting a number of memory access operations (e.g., read operations) that have been performed with respect to a corresponding set of memory cells. In some implementations, an address range can be represented, e.g., by a physical address range defined by the starting physical address and the final physical address. Alternatively, an address range can be represented, e.g., a logical address range defined by the starting logical address and the final logical address. Each set of memory cells can be represented, e.g., by a block of a memory array or a logical translation unit. The memory access operation counters can be stored in a metadata structure maintained in a metadata area of the memory device. The metadata structure can be represented by a linear array, which can be indexed by the ordinal number (e.g., position) of the address range within the address space, as described in more detail herein above.

At operation 620, the processing logic identifies, among the plurality of address ranges, an address range associated with a maximum value of a corresponding memory access operation counter.

At operation 630, the processing logic causes a media management operation to be initiated with respect to a set of memory cells referenced by the identified address range. As noted herein above, a media management operation may be represented by a refresh operation, which may involve reading the data stored by a specified set of memory cells (e.g., a physical block of a memory device) referenced by an address falling within the chosen address range, correcting eventual errors, and copying the data into another set of memory cells (e.g., into another physical block of the memory device), as described in more detail herein above.

Responsive to determining, at operation 640, that a higher priority memory access operation is requested while the media management operation is being performed, the processing logic, at operation 650, suspends the media management operation.

At operation 660, the processing logic causes the requested higher priority memory access operation to be performed.

Upon completing the memory access operation, the processing logic, at operation 670, updates the memory access counter(s) associated with one or more address ranges specifying one or more sets of memory cells, with respect to which the memory access operation has been performed.

At operation 680, the processing logic resumes the suspended media management operation.

Upon completing the media management operation, the processing logic, at operation 690, marks the currently selected address range as being successfully processed (e.g., by setting a flag associated with the address range in the metadata structure that stores the memory access operation counters), Responsive to determining, at step 695, that a pre-defined terminating condition is satisfied (e.g., all the address ranges have been refreshed), the method terminates; otherwise, the method loops back to operation 620.

Figure 7:
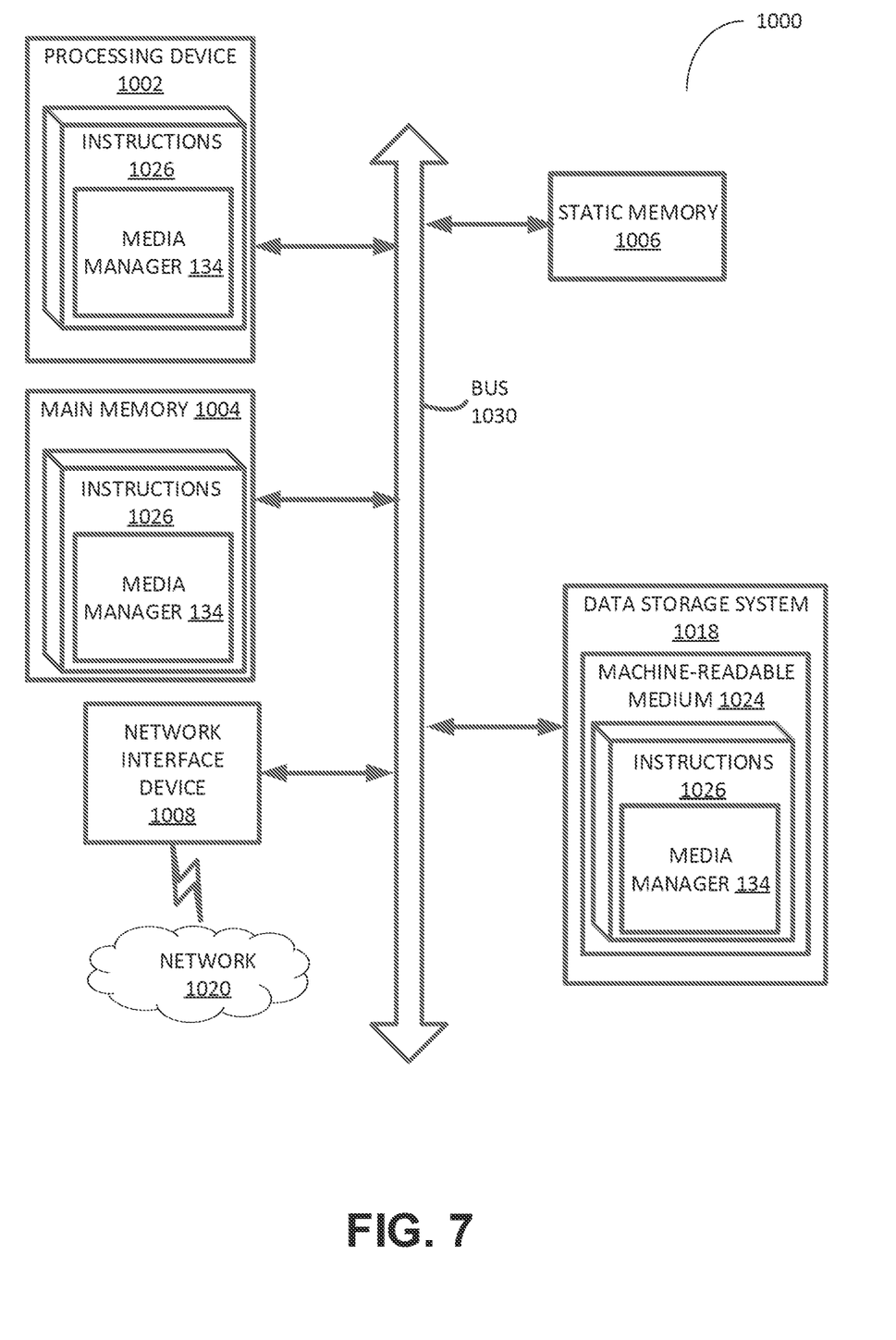
FIG. 7 illustrates an example machine of a computer system within which a set of instructions, for causing the machine to perform any one or more of the methodologies discussed herein, can be executed.

FIG. 7 illustrates an example machine of a computer system 1000 within which a set of instructions, for causing the machine to perform any one or more of the methodologies discussed herein, can be executed. In some embodiments, the computer system 1000 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to programming manager 104 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage system 1019, which communicate with each other via a bus 1030.

Processing device 1002 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 can also be one or more special-purpose processing devices such as an application specific integrated circuit (ASIC), a field programmable gate array (FPGA), a digital signal processor (DSP), network processor, or the like. The processing device 1002 is configured to execute instructions 1026 for performing the operations discussed herein, e.g., methods 500 and/or 600 implemented by the media manager 134 of FIG. 1. The computer system 1000 can further include a network interface device 1009 to communicate over the network 1020.

The data storage system 1019 can include a machine-readable storage medium 1104 (also known as a computer-readable medium, such as a non-transitory computer-readable medium) on which is stored one or more sets of instructions 1026 or software embodying any one or more of the methodologies or functions described herein. The instructions 1026 can also reside, completely or at least partially, within the main memory 1004 and/or within the processing device 1002 during execution thereof by the computer system 1000, the main memory 1004 and the processing device 1002 also constituting machine-readable storage media. The machine-readable storage medium 1024, data storage system 1019, and/or main memory 1004 can correspond to the memory sub-system 110 of FIG. 1.

In one embodiment, the instructions 1026 include instructions to implement functionality corresponding to programming manager 104 of FIG. 1). While the machine-readable storage medium 1024 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system, comprising:
 a memory array comprising a plurality of memory cells; and
 a controller coupled to the memory array, the controller to perform operations comprising:
  determining, based on a Production State Awareness (PSA) information, whether the memory array operates in a field environment;
  responsive to determining that the memory array operates in the field environment, identifying a plurality of address ranges referencing respective sets of memory cells of the memory array, wherein each address range is associated with a respective memory access operation counter reflecting a number of memory access operations that have been performed with respect to a corresponding set of memory cells;
  identifying, among the plurality of address ranges, an address range associated with a maximum value of a corresponding memory access operation counter; and
  causing a media management operation to be performed with respect to a set of memory cells referenced by the identified address range.

2. The system of claim 1, wherein each address range of the plurality of address ranges is one of: a logical address range defined by a starting logical address and a final logical address or a physical address range defined by a starting physical address and a final physical address.

3. The system of claim 1, wherein each memory address operation counter reflects a number of read operations.

4. The system of claim 1, wherein the media management operation is a refresh operation.

5. The system of claim 1, wherein the operations further comprise:
receiving a memory access command;
identifying an address range comprising an address specified by the memory access command; and
incrementing a memory access operation counter associated with the address range.

6. The system of claim 1, wherein the operations further comprise:
responsive to receiving a memory access command while the media management operation is active, suspending the media management operation;
performing a memory access operation specified by the memory access command; and
updating one or more memory access operation counters to reflect the memory access operation performed in response to the memory access command.

7. The system of claim 1, wherein each address range of the plurality of address ranges references a predefined number of blocks of the memory array.

8. The system of claim 1, wherein each address range of the plurality of address ranges references a predefined number of logical translation units of the memory array.

9. The system of claim 1, wherein the operations further comprise:
responsive to detecting a system power up event, tracking, for a predefined period of time, memory access operations to initialize memory access operation counters corresponding to the plurality of address ranges.

10. The system of claim 1, wherein the operations further comprise:
responsive to detecting a system power up event, tracking, for a predefined amount of data traffic, memory access operations to initialize memory access operation counters corresponding to the plurality of address ranges.

11. A computer-readable non-transitory storage medium comprising executable instructions that, when executed by a controller managing a memory array comprising a plurality of memory cells, cause the controller to perform operations, comprising:
determining, based on a Production State Awareness (PSA) information, whether the memory array operates in a field environment;
responsive to determining that the memory array operates in the field environment, identifying a plurality of address ranges referencing respective sets of memory cells of the memory array, wherein each address range is associated with a respective memory access operation counter reflecting a number of memory access operations that have been performed with respect to a corresponding set of memory cells;
identifying, among the plurality of address ranges, an address range associated with a maximum value of a corresponding memory access operation counter; and
causing a media management operation to be performed with respect to a set of memory cells referenced by the identified address range.

12. The computer-readable non-transitory storage medium of claim 11, wherein each address range of the plurality of address ranges is one of: a logical address range defined by a starting logical address and a final logical address or a physical address range defined by a starting physical address and a final physical address.

13. The computer-readable non-transitory storage medium of claim 11, wherein each memory address operation counter reflects a number of read operations.

14. The computer-readable non-transitory storage medium of claim 11, wherein the media management operation is a refresh operation.

15. The computer-readable non-transitory storage medium of claim 11, wherein the operations further comprise:
receiving a memory access command;
identifying an address range comprising an address specified by the memory access command; and
incrementing a memory access operation counter associated with the address range.

16. The computer-readable non-transitory storage medium of claim 11, wherein the operations further comprise:
responsive to receiving a memory access command while the media management operation is active, suspending the media management operation;
performing a memory access operation specified by the memory access command; and
updating one or more memory access operation counters to reflect memory access operation performed in response to the memory access command.

17. A method, comprising:
determining, by a controller managing a memory array, based on a Production State Awareness (PSA) information, whether the memory array operates in a field environment;
responsive to determining that the memory array operates in the field environment, identifying, a plurality of address ranges referencing respective sets of memory cells of the memory array, wherein each address range is associated with a respective memory access operation counter reflecting a number of memory access operations that have been performed with respect to a corresponding set of memory cells;
identifying, among the plurality of address ranges, an address range associated with a maximum value of a corresponding memory access operation counter; and
causing a media management operation to be performed with respect to a set of memory cells referenced by the identified address range.

18. The method of claim 17, wherein each address range of the plurality of address ranges is one of: a logical address range defined by a starting logical address and a final logical address or a physical address range defined by a starting physical address and a final physical address.

19. The method of claim 17, wherein each memory address operation counter reflects a number of read operations.

20. The method of claim 17, wherein the operations further comprise:
responsive to receiving a memory access command while the media management operation is active, suspending the media management operation;
performing a memory access operation specified by the memory access command; and updating one or more memory access operation counters to reflect the memory access operation performed in response to the memory access command.

\* \* \* \* \*